United States Patent
Sugihara

(10) Patent No.: US 8,199,242 B2
(45) Date of Patent: Jun. 12, 2012

(54) CAMERA AND IMAGE PROCESSING PROGRAM

(75) Inventor: Mari Sugihara, Tokyo (JP)

(73) Assignee: Nikon Corporation, Tokyo (JP)

( * ) Notice: Subject to any disclaimer, the term of this patent is extended or adjusted under 35 U.S.C. 154(b) by 677 days.

(21) Appl. No.: 12/225,159

(22) PCT Filed: Mar. 2, 2007

(86) PCT No.: PCT/JP2007/000163
§ 371 (c)(1),
(2), (4) Date: Sep. 16, 2008

(87) PCT Pub. No.: WO2007/108200
PCT Pub. Date: Sep. 27, 2007

(65) Prior Publication Data
US 2009/0185046 A1    Jul. 23, 2009

(30) Foreign Application Priority Data

Mar. 23, 2006    (JP) ................................. 2006-079966

(51) Int. Cl.
H04N 5/222    (2006.01)
H04N 5/238    (2006.01)
(52) U.S. Cl. .................................. 348/333.12; 348/365
(58) Field of Classification Search ............... 348/231.5, 348/239, 333.01, 333.12, 384; 382/118
See application file for complete search history.

(56) References Cited

U.S. PATENT DOCUMENTS

| | | | | |
|---|---|---|---|---|
| 5,986,706 A * | 11/1999 | Hirasawa | ...................... | 348/372 |
| 7,508,419 B2 * | 3/2009 | Toyama et al. | ............ | 348/211.3 |
| 7,734,098 B2 * | 6/2010 | Kikkawa et al. | ............... | 382/195 |
| 7,936,919 B2 * | 5/2011 | Kameyama | ................... | 382/167 |
| 2003/0071908 A1 | 4/2003 | Sannoh et al. | | |
| 2004/0207743 A1 * | 10/2004 | Nozaki et al. | ............ | 348/333.12 |
| 2005/0046729 A1 | 3/2005 | Taguchi et al. | | |
| 2005/0117044 A1 | 6/2005 | Suto | | |
| 2005/0134707 A1 * | 6/2005 | Perotti et al. | ................... | 348/239 |
| 2005/0231613 A1 * | 10/2005 | Skurdal et al. | ................ | 348/239 |
| 2005/0264658 A1 * | 12/2005 | Ray et al. | ...................... | 348/239 |
| 2005/0264685 A1 * | 12/2005 | Hoshuyama et al. | ......... | 348/370 |

FOREIGN PATENT DOCUMENTS

| | | |
|---|---|---|
| JP | A-09-211679 | 8/1997 |
| JP | A-10-26967 | 1/1998 |
| JP | A-10-247135 | 9/1998 |
| JP | A-2001-008064 | 1/2001 |

(Continued)

OTHER PUBLICATIONS

Supplementary European Search Report issued on Apr. 6, 2010 in European Patent Application No. 07713545.7.

(Continued)

*Primary Examiner* — Trung Diep
(74) *Attorney, Agent, or Firm* — Oliff & Berridge, PLC

(57) ABSTRACT

To insert an inserting-image at an appropriate position of image data by providing an imaging unit imaging an image of an object and generating the image data, a recognizing unit performing face recognition processing on the image data and generating distribution information which represents a distribution of a main object in an image of the image data, and a decision unit determining an inserting position to insert the inserting-image into the image data based on at least one of the distribution information and contrast information of the object.

22 Claims, 8 Drawing Sheets

FOREIGN PATENT DOCUMENTS

| | | |
|---|---|---|
| JP | A-2001-136424 | 5/2001 |
| JP | A-2002-010066 | 1/2002 |
| JP | A-2002-368978 | 12/2002 |
| JP | A-2004-46591 | 2/2004 |
| JP | A-2004-147174 | 5/2004 |
| JP | A-2005-184778 | 7/2005 |
| JP | A-2006-033370 | 2/2006 |

OTHER PUBLICATIONS

Dec. 2, 2011 Extended Search Report issued in European Patent Application No. 11183723.3.

Office Action dated Feb. 7, 2012 issued in related Japanese Patent Application No. 2008-506171. (with English language translation).

* cited by examiner

CAMERA AND IMAGE PROCESSING PROGRAM

CROSS-REFERENCE TO RELATED APPLICATION

This application is a U.S. National Stage application claiming the benefit of prior filed International Application Number PCT/JP2007/000163, filed Mar. 2, 2007, in which the International Application claims a priority date of Mar. 23, 2006 based on prior filed Japanese Application Number 2006-079966, the entire contents of which are incorporated herein by reference.

TECHNICAL FIELD

The present invention relates to a camera and an image processing program inserting an inserting-image into image data.

BACKGROUND ART

There is a camera which includes a function inserting an inserting-image such as a date into image data generated by imaging. Patent document 1 proposes an image shooting apparatus using a technique to prevent a main part of an image from overlapping with the inserting-image by determining a position to insert the inserting-image based on a focused position in a shooting image plane.

Patent document 1: Japanese Unexamined Patent Application Publication No. 2001-136424

DISCLOSURE

Problems to be Solved

However, the above image shooting apparatus of Patent document 1 determines the inserting position to be a position in a neighborhood of a focus detection region which is judged not to be focused, and therefore, when the region is a main part of the image which includes a main object or the like, the main part of the image sometimes overlaps with the inserting-image. Further, the decision of the inserting position based on the focused position sometimes determines a position which has a low visibility to be a position for the inserting position.

The present invention has been achieved in view of the above problems and aims for providing a camera and an image processing program capable of inserting an inserting-image into an appropriate position of image data.

Means for Solving the Problems

A camera of the present invention includes an imaging unit imaging an image of an object and generating image data, a recognizing unit performing face recognition processing on the image data and generating distribution information which represents a distribution of a main object in an image of the image data, and a decision unit determining an inserting position to insert an inserting-image into the image data based on at least one of the distribution information and contrast information of the object.

Another camera of the present invention includes an imaging unit imaging an image of an object and generating image data, and a decision unit limiting an inserting area of an inserting-image in an image of the image data based on attribute information of the inserting-image to be inserted in the image data and determining an inserting position to insert the inserting-image within the inserting area based on information of the object in the image data.

Note that the camera may further include an inserting unit inserting the inserting-image at the inserting position of the image data determined by the decision unit.

Further the camera may include a recording unit recording and associating the image data generated by the imaging unit, image data of the inserting-image, and the inserting position determined by the decision unit into a recording medium.

Still further, the inserting-image may be an image representing a shooting condition of the imaging unit.

Moreover, the decision unit may determine the inserting position based on the distribution information and the contrast information.

Moreover, the decision unit may determine weight of the distribution information and weight of the contrast information such that a ratio of the weight for the distribution information to the weight for the contrast information to be larger as an area ratio of the main object to the whole object becomes larger, and may determine the inserting position based on the distribution information and the contrast information weighted with the respective weights.

Moreover, the camera may further include a setting unit setting any shooting mode among a plurality of shooting modes, wherein the imaging unit images the image of the object and generates the image data in a shooting condition according to the shooting mode set by the setting unit, and the decision unit determines weights of the distribution information and the contrast information based on a kind of the shooting mode set by the setting unit and determines the inserting position based on the distribution information and the contrast information weighted with the respective weights.

Moreover, the decision unit may limit the inserting area of the inserting-image in the image of the image data based on attribute information of the inserting-image and may determine the inserting position to insert the inserting-image within the inserting area.

Note that an image processing program, which converts the configuration according to the above invention into a program realizing image processing of the image data to be processed, is also effective as a specific embodiment of the present invention.

According to a camera and an image processing program of the present invention, it is possible to insert an inserting-image at an appropriate position of image data.

DETAILED DESCRIPTION OF THE EMBODIMENTS

<First Embodiment>

Hereinafter, a first embodiment of the present invention will be described with reference to the drawings. The first embodiment will describe a digital still camera as an example.

Figure 1:
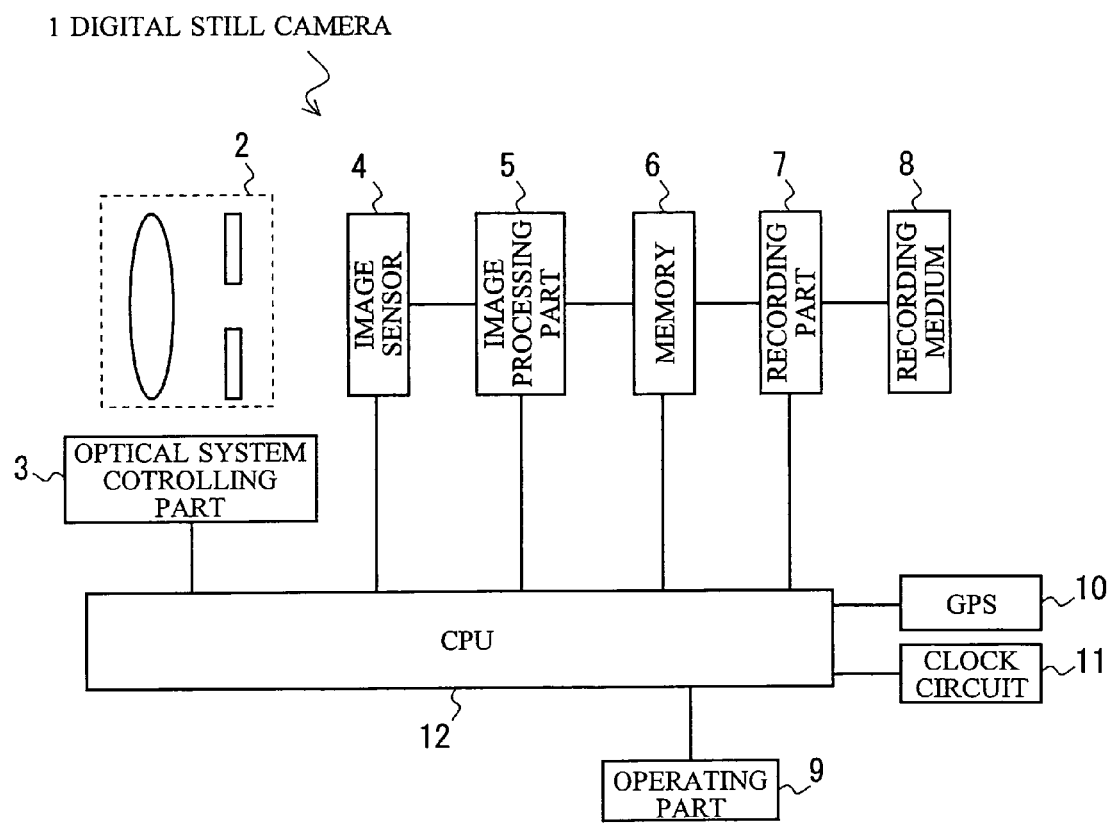
FIG. 1 is a diagram showing a configuration of a digital still camera 1 according to a fist embodiment.

FIG. 1 is a diagram showing a configuration of a digital still camera 1 according to the first embodiment. As shown in FIG. 1, the digital still camera 1 includes an optical system 2, an optical system controlling part 3, an image sensor 4, an image processing part 5, a memory 6, a recording part 7, a recording medium 8, an operating part 9, a GPS (Global Positioning System) 10, a clock circuit 11, and a CPU 12. The optical system 2 includes a lens, an aperture, etc. Further, the optical system 2 is interchangeable. The optical system controlling part 3 performs control operations of the aperture and a focus position of the lens. The image sensor 4 converts an object image focused through the optical system 2 into image data and outputs the image data to the image processing part 5. The image processing part 5 performs various kinds of digital signal processing such as color signal generation, matrix conversion processing, γ-conversion processing, correction processing, and image processing for inserting an inserting-image representing a shooting condition. Note that description of a specific method for each of the image processing will be omitted. The memory 6 records the image data temporarily after the image processing by the image processing part 5. The recording part 7 records the image data recorded temporarily in the memory 6 into the recording medium 8. The recording medium 8 is a removable memory such as a memory card. The operating part 9 includes a power button (not shown in the drawing), a release button, a shooting mode selection dial, etc. The GPS 10 obtains positional information of the digital still camera 1. The clock circuit 11 has information of a shooting date and time. The CPU 12 controls each of the parts collectively. Further, the CPU 12 determines an inserting position of an inserting-image. Details of the determination will be described hereinafter. Further, the CPU 12 records a program preliminarily for executing each of the processing.

Further, the digital still camera 1 has a plurality of shooting modes. The plurality of shooting modes includes a "portrait mode", a "landscape mode", an "auto-mode", etc. A user sets any of the shooting modes by operating the operating part 9. The CPU 12 performs imaging in a condition according to the set shooting mode.

Further, the digital still camera 1 has a function to insert an inserting-image into the image data generated by the imaging. The inserting-images include shooting-related information and stamp information. The shooting-related information is information related to shooting such as a shooting condition during imaging (exposure, shutter speed, etc), a shooting date and time, and positional information. The shooting date and time is obtained by the clock circuit 11. The positional information is obtained by the GPS 10. The stamp information is information for performing an additional representation such as a text message, a symbol, and a figure. The CPU 12 records preliminarily multiple kinds of the stamp information. A specification relating to the above insertion of the inserting-image is performed preliminarily by the user. The user specifies what kind of inserting-image is to be inserted by operating the operating part 9.

Operation of the CPU 12 in the shooting of the digital still camera 1 will be described with reference to the flowcharts in FIG. 2 and FIG. 3.

Step S1: The CPU 12 judges whether start of shooting is instructed or not. Then, the CPU 12 goes to Step S2 if the start of shooting is instructed. The user instructs start of the shooting by operating the release button in the operating part 9.

Figure 4:
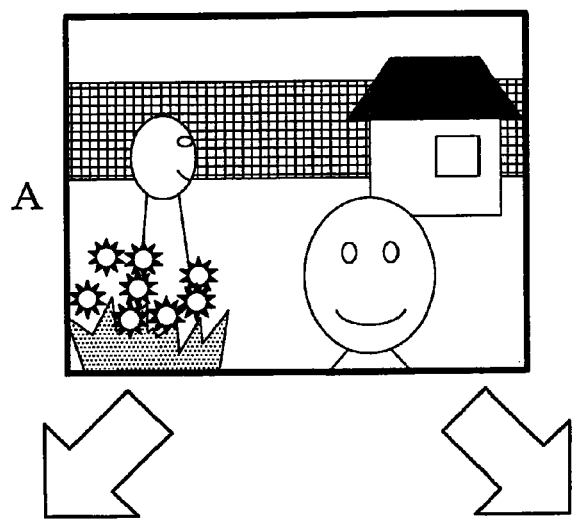
FIGS. 4A to 4D are diagrams illustrating decision of an inserting position and insertion of an inserting-image.
Figure 4:
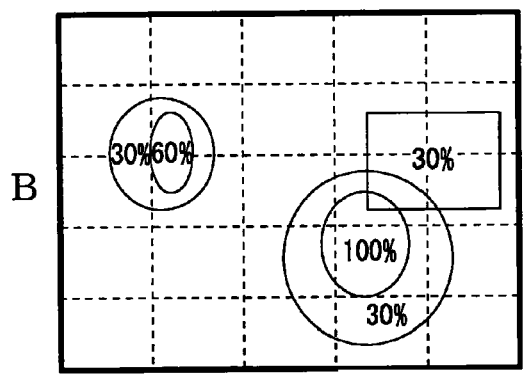
Figure 4:
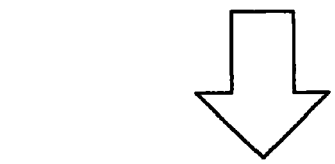

Step S2: The CPU 12, by controlling each part, images an object image through the optical system 2 and generates image data. Then, the CPU 12 records the generated image data temporarily into the memory 6. FIG. 4A shows an example of the generated image data.

Step S3: The CPU 12 judges whether the insertion is specified or not. Then, the CPU 12 goes to Step S4, if the insertion is specified. On the other hand, if the insertion is not specified, the CPU 12 goes to Step S20 to be described below.

Step S4: The CPU 12 calculates a face distribution evaluation value Dfx. The CPU 12 converts a color space of the image data recorded temporarily in the memory 6 from the RGB color space into the Lab color space, for example. The CPU 12 detects a skin color region using a predetermined table representing the skin color. The CPU 12 judges whether or not an eye exists in the detected skin color region. Specifically, the CPU 12 judges whether an eye exists or not using a predetermined table of information representing an eye (color, size, etc.).

The CPU 12 obtains an accuracy of each skin color region based on the detection result of the skin color region and the determination whether or not an eye exists in the skin color region. For example, the accuracy is set to be 100% when both eyes exist in a certain skin color region. Further, the accuracy is set to be 60% when only one eye exists in a certain skin color region. Further, the accuracy is set to be 30% when any eye does not exist in a certain skin color region. FIG. 4B shows examples of the accuracies.

The CPU 12 divides a whole image plane into 25 small areas of five rows and five columns as shown in FIG. 4B. Then, the CPU 12 calculates the face distribution evaluation value Dfx (x=1 to 25) for each of the small areas using the following formula.

Face distribution evaluation value $Dfx$=(Accuracy of the skin color region existing in the small area)× (Area ratio of the skin color region to the small area)    (Formula 1)

FIG. 4C shows an example of the face distribution evaluation value Dfx. The face distribution evaluation value Dfx shows larger value as the accuracy that the face of an object exists in the small area is higher.

Step S5: The CPU 12 calculates a contrast distribution evaluation value Dcx. The CPU 12 obtains the contrast distribution evaluation value Dcx for each of the 25 small areas of the image data recorded temporarily in the memory 6.

The CPU 12 divides the whole image plane into 25 small areas as in Step S4. The CPU 12 detects the maximum value among luminance values of pixels of the small area. Further, the CPU 12 detects the minimum value among luminance values of pixels in the small area. For this luminance value, the L value of the image data in the Lab color space obtained in Step S4 is used. Then, the CPU 12 calculates the contrast distribution evaluation value Dcx (x=1 to 25) for each of the small areas using the following formula.

Contrast distribution evaluation value $Dcx$={(Maximum luminance value)−(Minimum luminance value)}/(Number of gradations)×100    (Formula 2)

The number of gradations is 256 for eight bits, for example. FIG. 4D shows an example of the contrast distribution evaluation value Dcx. The contrast distribution evaluation value Dcx shows a larger value as the contrast in the small area is higher. Note that the G component value of the image data in the RGB color space may replace the luminance value in the above formula.

Step S6: The CPU 12 judges whether the shooting mode is the "portrait mode" or not. Then, the CPU 12 goes to Step S10 to be described below, if the shooting mode is judged to be the "portrait mode". On the other hand, if the shooting mode is judged to be a shooting mode other than the "portrait mode", the CPU 12 goes to Step S7.

Step S7: The CPU 12 judges whether the shooting mode is the "landscape mode" or not. Then, the CPU 12 goes to Step S11 to be described below, if the shooting mode is judged to be the "landscape mode". On the other hand, if the shooting mode is judged to be a shooting mode other than the "landscape mode", the CPU 12 goes to Step S8.

Step S8: The CPU 12 calculates a face region area S. The CPU 12 obtains a sum of the number of the skin color regions which have the accuracy of 50% or higher in Step S4 and sets the sum as the face region area S.

Step S9: The CPU 12 compares the face region area S and threshold value Tl or Th. The CPU 12 goes to Step S10, if it is judged that the face region area S≧the threshold value Th. The CPU 12 goes to Step S11 to be described below, if it is judged that the face region area S≦the threshold value Tl. The CPU 12 goes to Step S12, if it is judged that the threshold value Tl<the face region area S<the threshold value Th. Note that the threshold values Tl and Th are predetermined threshold values.

Step S10: The CPU 12 determines that many face regions of the object exist in the image plane, that is, a person is a main object, if the shooting mode is the "portrait mode" (YES in Step S6) or the face region area S≧the threshold value Th. Then, the CPU 12 determines a weight coefficient Wf of the face distribution evaluation value Dfx to be one and a weight coefficient Wc of the contrast distribution evaluation value Dcx to be zero. By determining the weight coefficients Wf and Wc in this manner, it is possible to determine the inserting position as described below emphasizing the face distribution of the object in the image.

Step S11: The CPU 12 determines that the number of the face regions of the object is small in the image plane, that is, a landscape or the like is the main object, if the shooting mode is the "landscape mode" (YES in Step S7) or the face region area S≦the threshold value Tl. Then, the CPU 12 determines the weight coefficient Wf of the face distribution evaluation value Dfx to be zero and the weight coefficient Wc of the contrast distribution evaluation value Dcx to be one. By determining the weight coefficients Wf and Wc in this manner, it is possible to determine the inserting position as described below emphasizing the contrast of the image.

Step S12: The CPU 12 determines the weight coefficient Wf of the face distribution evaluation value Dfx to be one and the weight coefficient Wc of the contrast distribution evaluation value Dcx to be one. By determining the weight coefficients Wf and Wc in this manner, it is possible to determine the inserting position as described below considering both of the face distribution of the object in the image and the contrast of the image.

Step S13: The CPU 12 calculates an object distribution evaluation value Dx (x=1 to 25) using the face distribution evaluation value Dfx calculated in Step S4, the contrast distribution evaluation value Dcx calculated in Step S5, and the weight coefficients Wf and Wc determined in any of Step S10 to Step S12. The CPU 12 calculates the object distribution evaluation value Dx (x=1 to 25) according to the following formula for each of the small areas described in Step S4 and Step S5, using the above described respective factors. Note that the weight coefficients Wf and Wc have the same values, respectively, for all the small areas.

$$\text{Object distribution evaluation value } Dx = \{(Wf \times Dfx) + (Wc \times Dcx)\}/(Wf + Wc) \quad \text{(Formula 3)}$$

Figure 5:
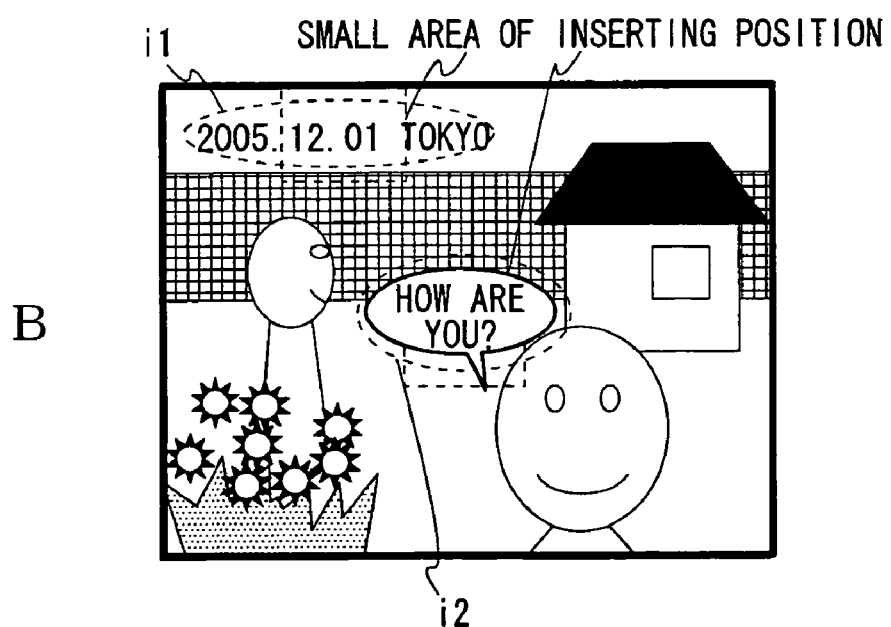
FIGS. 5A and 5B are diagrams (continued) illustrating the decision of the inserting position and the insertion of the inserting-image.

FIG. 5A shows an example of the object distribution evaluation value Dx. The object distribution evaluation value Dx shows a larger value as the accuracy that the main object exists in the small area is higher.

Step S14: The CPU 12 determines whether insertion of the shooting-related information is specified or not. Then, the CPU 12 goes to Step S15, if the insertion of the shooting-related information is specified. On the other hand, if the insertion of the shooting-related information is not specified, the CPU 12 goes to Step S17.

Step S15: The CPU 12 determines the inserting position of the shooting-related information according to the object distribution evaluation value Dx calculated in Step S13. The inserting position of the shooting-related information is assumed to be selected from among the small areas included in the first row and the fifth row. The small area included in the first row or the fifth row is the inserting position preferable for the property of the shooting-related information. The CPU 12 selects the small area having the minimum object distribution evaluation value Dx from among the small areas in the first row and the fifth row, and determines the small area to be the inserting position for the shooting-related information. Note that a user may select the inserting position among small areas displayed as candidates for the inserting position of the shooting-related information. Further, the CPU 12 may be configured to select a candidate for the inserting position according to an attribute of the shooting-related information.

Step S16: The CPU 12 inserts the shooting-related information in the inserting position determined in Step S15 for the image data recorded temporarily in the memory 6 by controlling the image processing part 5. FIG. 5B shows an example of the image having the inserted shooting-related information. FIG. 5B shows an example of a case in which the CPU 12 determines the small area in the first row and the second column to be the inserting position in Step S15 and inserts the shooting date and time and the positional information of the digital still camera 1 as the shooting-related information (i1). The CPU 12 inserts the shooting-related information such that the center of the small area in the first row and the second column for the inserting position overlaps with the center of the inserting-image for the shooting-related information. Note that the CPU 12 obtains the positional information of the digital still camera 1 by controlling the GPS 10. Further, the CPU 12 obtains the shooting date and time from the clock circuit 11. The CPU 12 records the image data having the inserted shooting-related information temporarily in the memory 6.

Step S17: The CPU 12 judges whether the insertion of the stamp information is specified or not. Then the CPU 12 goes to Step S18, if the insertion of the stamp information is specified. On the other hand, if the insertion of the stamp information is not specified, the CPU 12 goes to Step S20 to be described below.

Step S18: The CPU 12 determines the inserting position of the stamp information based on the object distribution evaluation value Dx calculated in Step S13. The inserting position of the stamp information is assumed to be selected from among the small areas included in the second row to the fourth row. The small area included in the second row to the fourth row is the inserting position preferable for the property of the stamp information. The CPU 12 selects the small area having the minimum object distribution evaluation value Dx among the small areas included in the second row to the fourth row and determines the small area to be the inserting position for the stamp information. Note that the user may select the inserting position among the small areas displayed as candidates for the inserting position of the stamp information. Further, the CPU 12 may be configured to select a candidate for the inserting position according to an attribute of the stamp information.

Step S19: The CPU 12 inserts the stamp information at the inserting position determined in Step S18 for the image data recorded temporarily in the memory 6 by controlling the image processing part 5. FIG. 5B shows an example of the image having the inserted stamp information. FIG. 5B shows an example of a case in which the CPU 12 determines the small area in the third row and the third column to be the inserting position in Step S18 and inserts a message of "How are you?" as the stamp information (i2). The CPU 12 inserts the stamp information such that the center of the small area in the third row and the third column overlaps with the center of the inserting-image of the stamp information. The CPU 12 records the image data having the inserted stamp information temporarily in the memory 6.

Step S20: The CPU 12 records the image data recorded temporarily in the memory 6 into the recording medium 8 by controlling each of the parts. Note that the CPU 12 may associate and record the image before the insertion of the inserting-image and the image after the insertion into the recording medium 8. The CPU 12 may also associate and record the image generated by the imaging, the image data of the inserting-image, and the inserting position into the recording medium 8 without inserting the inserting-image. Further, the CPU 12 may associate and record the image data generated by the imaging, the image data of the inserting-image, and the inserting information (some of or all of the face distribution evaluation value Dfx, the contrast distribution evaluation value Dcx, the weight coefficients Wf and Wc, and the object distribution evaluation value Dx) into the recording medium 8 without determining the inserting position.

As described above, the first embodiment images the object image to generate the image data and generates the distribution information representing the distribution of the main object in the image of the image data by performing face recognition processing on the image data. Then, the first embodiment determines the inserting position to insert the inserting-image into the image data based on at least one of the distribution information and the contrast information of the object. Accordingly, it is possible to insert the inserting-image at an appropriate position of the image data. In particular, by determining the inserting position according to the distribution of the object in the image plane, it is possible to avoid the problem such as one that the main image part and the inserting-image overlap with each other or a position having a low visibility is determined to be the inserting position.

Further, the first embodiment images the object image to generate the image data, limits the inserting area for the inserting-image in the image of the image data based on the attribute information of the inserting-image, and determines the inserting position to insert the inserting-image within the inserting area based on the object information in the image data. Accordingly, it is possible to insert the inserting-image at an appropriate position according to the attribute of the inserting-image.

Still further, the first embodiment inserts the inserting-image at the determined inserting position of the image data. Accordingly, it is possible to insert the inserting-image into the image data only when the inserting-image needs to be inserted.

Moreover, the first embodiment associates and records the generated image data, the image data of the inserting-image, and the determined inserting position into the recording medium. Accordingly, it is possible to insert the inserting-image at an appropriate position at a desired timing after the shooting.

Moreover, the first embodiment determines the weights of the distribution information and the contrast information such that the ratio of the weight for the distribution information to the weight for the contrast information to be larger as the area ratio of the main object to the whole object becomes larger, and determines the inserting position based on the distribution information and the contrast information weighted with the respective weights. Accordingly, when the area ratio of the main object to the whole object is large, it is determined that many face regions of the object exist in the image plane, that is, a person is the main object. Thereby, it is possible to determine the inserting position emphasizing the face distribution of the object in the image. On the other hand, when the area ratio of the main object to the whole object is small, it is determined that the number of the face regions of the object is small in the image plane, that is, a landscape or the like is the main object. Thereby, it is possible to determine the inserting position emphasizing the contrast of the image.

Moreover, the first embodiment provides the setting unit setting any shooting mode among the plurality of shooting modes and images the object image in the shooting condition according to the shooting mode set by the setting unit to generate the image data, and also the first embodiment determines the weights of the distribution information and the contrast information based on the kind of the shooting. mode set by the setting unit and determines the inserting position based on the distribution information and the contrast information weighted with the respective weights. Accordingly, it is possible to determine the inserting position appropriately and automatically according to the kind of the shooting mode.

Note that, while the first embodiment shows the example performing the determination of the shooting mode (Step S6 and Step S7 in FIG. 2) and the determination by the face region area S (Step S9 in FIG. 2) for determining the weight coefficients Wf and Wc, only one of the determinations may be configured to be performed.

Further, while the first embodiment shows the example to determine preliminarily the inserting position candidates for the shooting-related information and the stamp information, the present invention is not limited to this example. For example, when the plurality of inserting-images is inserted, there may be another configuration which determines priority for each of the inserting-images and then decides the inserting position according to the priority so as to prevent the inserting-images from overlapping with each other. Further, there may be another configuration which decides the inserting position candidate preliminarily and performs the processing of Step S4, Step S5, and Step S13 in FIG. 2 and FIG. 3 on only the small area corresponding to the inserting position candidate.

Moreover, while the first embodiment provides the configuration which inserts the inserting-image in the imaging process as an example, there may be another configuration which inserts the inserting-image in a reproduction process reproducing the image which is generated by imaging and recorded in the recording medium 8. Further, there may be another configuration which determines the inserting position in the imaging process preliminarily and executes the insertion of the inserting-image in the reproduction process according to a user's instruction.

Figure 2:
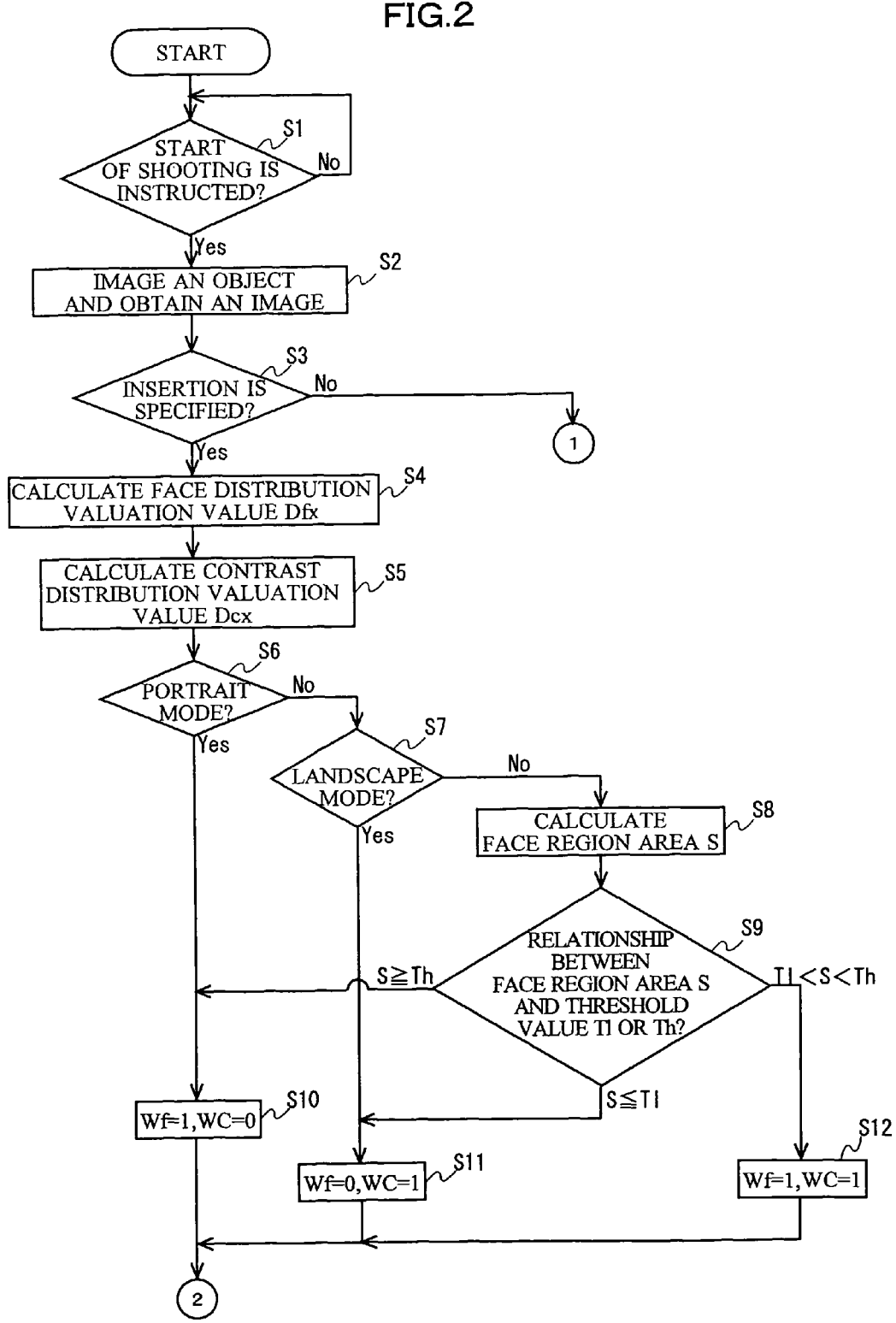
FIG. 2 is a flowchart showing an operation of the digital still camera 1 according to the first embodiment.
Figure 3:
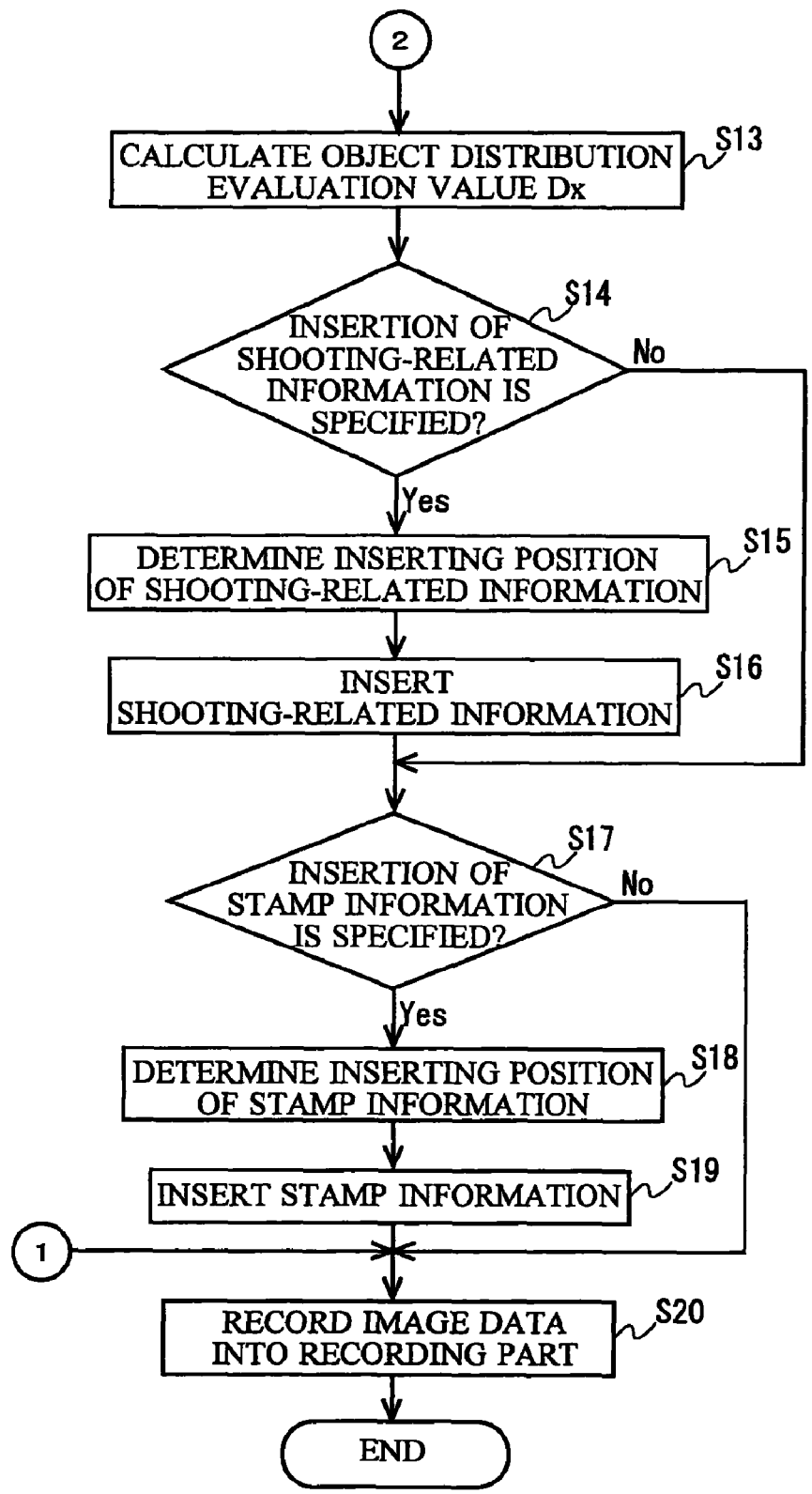
FIG. 3 is a flowchart (continued) showing the operation of the digital still camera 1. according to the first embodiment.

Moreover, while the first embodiment shows exemplarily the calculation method of the face distribution evaluation value Dfx in Step S4 of FIG. 2, the calculation method of the contrast distribution evaluation value Dcx in Step S5 of FIG. 2, the determination method of the weight coefficients Wf and Wc in Step S10 to Step S12 of FIG. 2, and the calculation method of the object distribution evaluation value Dx in Step S13 of FIG. 3, the present invention is not limited by the example of this embodiment. For example, in Step S10, the weight coefficients may be determined as Wf=0.9 and Wc=0.1. Also in Step S11, the weight coefficients may be determined as Wf=0.1 and Wc=0.9. Further, the calculation method or the determination method in each of the steps may have a configuration which can be specified by a user.

<Second Embodiment>

Hereinafter, a second embodiment of the present invention will be described with reference to the drawings. The second embodiment will describe a computer as an example.

Figure 6:
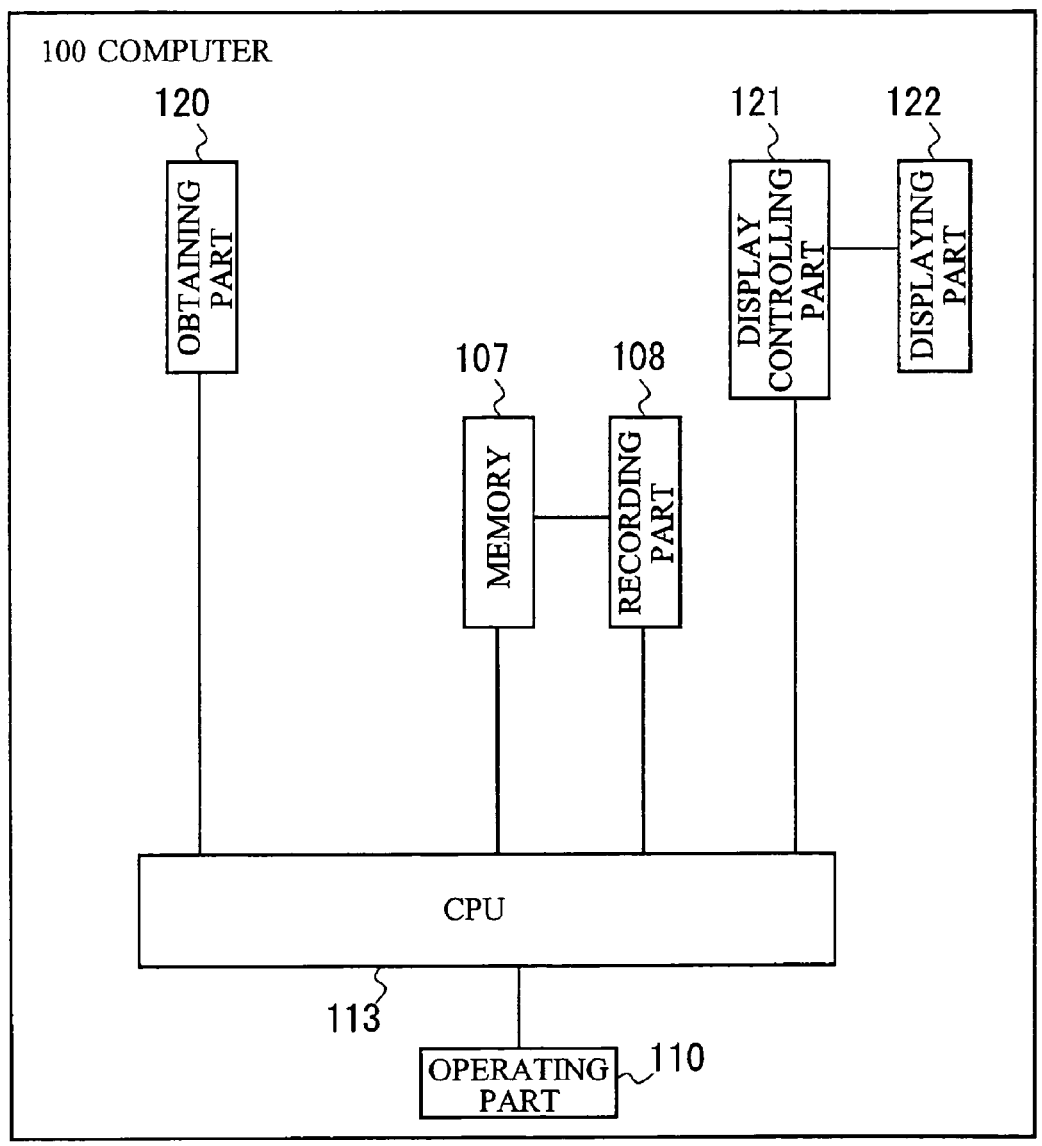
FIG. 6 is a diagram showing a configuration of a computer 100 according to a second embodiment.

FIG. 6 is a diagram showing a configuration of a computer 100 according to the second embodiment. The computer 100 includes, as shown in FIG. 6, a memory 107, a recording part 108, an operating part 110, a CPU 113, an obtaining part 120, a display controlling part 121, and a displaying part 122. The memory 107 records image data obtained by the obtaining part 120 or the like temporarily. The recording part 108 records the image data or the like recorded temporarily in the memory 107. The operating part 110 includes a power button, a mouse, a keyboard, etc. The CPU 113 controls each of the parts collectively. The CPU 113 also determines the inserting position of the inserting-image.

Details of the determination will be described hereinafter. Further, the CPU 113 records a program preliminarily for executing each processing. The obtaining part 120 obtains the image data from an external device such as a digital still camera or a recording medium via a wired connection, a wireless connection, a recording medium drive, or the like. The display controlling part 121 controls image displaying on the displaying part 122. The displaying part 122 includes an image displaying device such as a liquid crystal display device.

Next, operation of the CPU 113 in the computer 100 will be described with reference to the flowchart of FIG. 7.

Step S31: The CPU 113 judges whether a user has provided an instruction or not. Then, the CPU 113 goes to Step S32, if determining that the user has provided the instruction.

Step S32: The CPU 113 judges whether the user has instructed obtaining of image data or not. Then, the CPU 113 goes to Step S34 to be described below, if the user has instructed the obtaining of the image data. On the other hand, if determining that the user has provided an instruction other than the obtaining of the image data, the CPU 113 goes to Step S33.

Step S33: The CPU 113 performs processing according to the instruction. A specific method of the processing is the same as in a publicly known technique and description thereof will be omitted. The CPU 113 returns to Step S31 after having finished the processing according to the instruction.

Step S34: The CPU 113 obtains the image data from the external device or the recording medium by controlling the obtaining part 120. At this time, the CPU 113 obtains tag information together with the image data. Then, the CPU 113 records the obtained image data and the tag information temporarily into the memory 107.

Note that the tag information includes a kind of the shooting mode, inserting-image information, image data of the inserting-image, inserting information, etc. The kind of the shooting mode is information indicating a kind of the shooting mode during shooting the image data. The inserting-image information is original information for generating the inserting-image such as a shooting date and time, a shooting location, a shooting condition etc. The inserting-image information is code data representing a character, for example. The image data of the inserting-image is image data representing the shooting-related information or the stamp information as in the first embodiment. The inserting information is the inserting position information, the face distribution evaluation value Dfx, the contrast distribution evaluation value Dcx, the weight coefficients Wf and Wc, the object distribution evaluation value Dx, or the like, described in the first embodiment. Further, when a plurality of inserting-images exists, the inserting information includes information indicating priority of each of the inserting-images.

Step S35: The CPU 113 judges whether or not the inserting-image information or the image data of the inserting-image exists in the tag information. Then, if the inserting-image information or the image data of the inserting-image exists in the tag information, the CPU 113 goes to Step S36. On the other hand, if the inserting-image information or the image data of the inserting-image does not exist in the tag information, the CPU 113 goes to Step S38 to be described below.

Step S36: The CPU 113 judges whether or not the inserting position information exists in the tag information. Then, if the inserting position information exists in the tag information, the CPU 113 goes to Step S40 to be described below. On the other hand, if the inserting position information does not exist in the tag information, the CPU 113 goes to Step S37.

Note that the CPU 113 may judge whether or not the face distribution evaluation value Dfx, the contrast distribution evaluation value Dcx, the weight coefficients Wf and Wc, the object distribution evaluation value Dx, or the like exists in the tag information. Then, if the object distribution evaluation value Dx does not exist in the tag information, the CPU 113 calculates the object distribution evaluation value Dx and goes to Step S40 to be described below.

Step S37: The CPU 113 determines the inserting position. The CPU 113 determines the inserting position as same as in the above described first embodiment. The CPU 113 may be configured to perform this determination as needed according to the information included in the image data or the tag information obtained in Step S34.

For example, the CPU 113 performs the same processing as in Step S4 to Step S13 of the flowcharts in FIG. 2 and FIG. 3 and calculates the object distribution evaluation value Dx. Then, the CPU 113 performs the same processing as in Step S14, Step S15, Step S17, and Step S18 of the flowchart in FIG. 3 and determines the inserting positions of the shooting-related information and the stamp information.

Step S38: The CPU 113 judges whether an insertion indication has been provided or not. Then, if the insertion indication has been provided, the CPU 113 goes to Step S39. On the other hand, if the insertion indication has not been provided, the CPU 113 completes a series of the processing. Note that the user performs the insertion specification by operating the operating part 110.

Step S39: The CPU 113 determines the inserting position by recognizing the position specified by the user in Step S38.

Step S40: The CPU 113 generates a preview image from the image data recorded temporarily in the memory 107 for displaying an overlapping image. The preview image is an image in which the inserting-image is disposed at the inserting position determined in Step S37 or Step S39, or at the inserting position recorded in the tag information. When the CPU 113 recognizes that the image data of the inserting-image exists in the tag information, the CPU 113 inserts this image data as the inserting-image. Further, when the CPU 113 recognizes that the inserting-image information exists in the tag information, the CPU 113 generates and inserts the inserting-image based on the inserting-image information. When the CPU 113 inserts the plurality of inserting-images, the CPU 113 may dispose the plurality of inserting-images in the preview image at the same time. After generating the preview image, the CPU 113 records the generated preview image temporarily in the memory 107.

Figure 8:
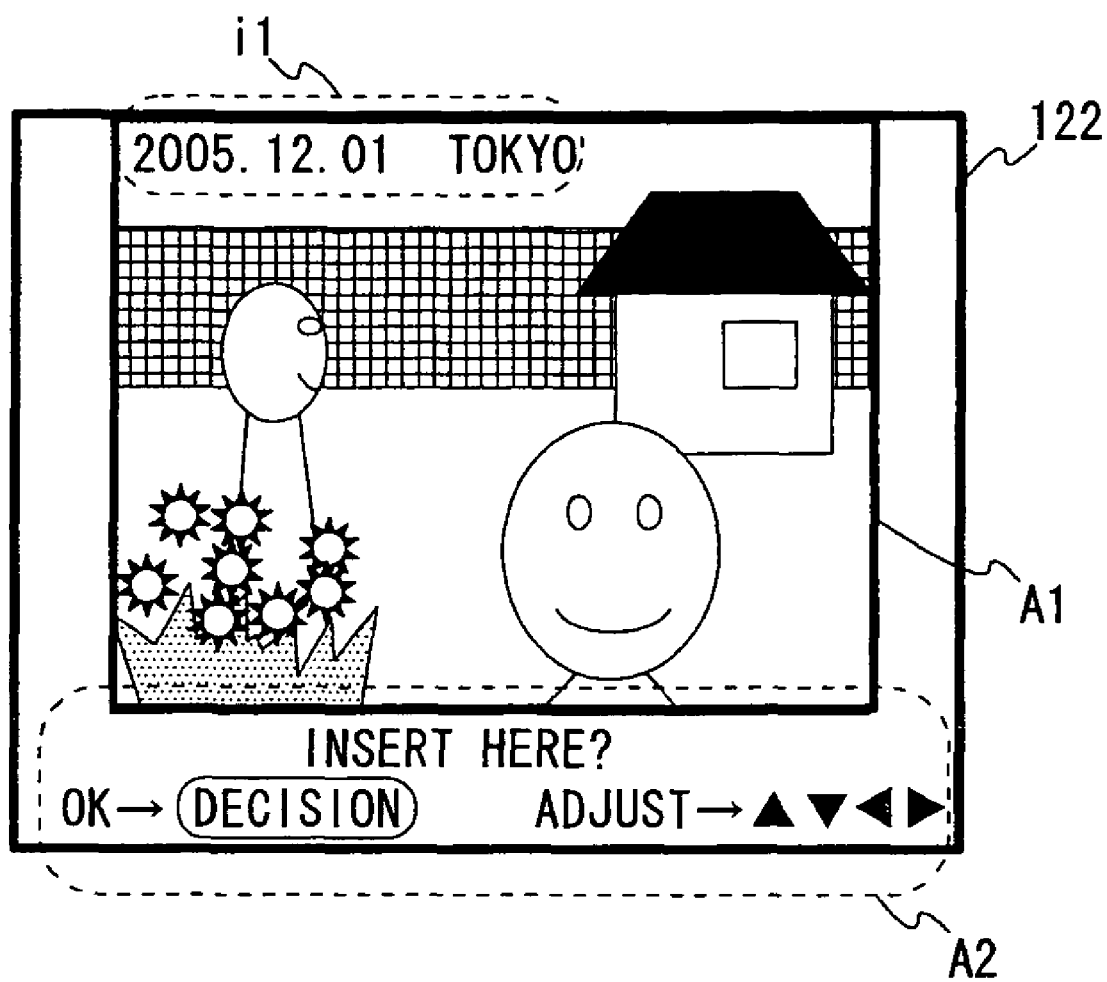
FIG. 8 is a diagram showing a display example of a preview image.

Step S41: The CPU 113 reads the image data obtained in Step S34 and the preview image generated in Step S40 from the memory 107 and displays the overlapping image on the displaying part 122 by controlling the display controlling part 121. FIG. 8 shows a display example. The example of FIG. 8 shows a case of inserting the shooting-related information indicated by i1. The CPU 113, as shown in FIG. 8, displays the image of the image data obtained in Step S34 overlapping with the preview image generated in Step S40 in the area A1 of the display part 122. Further, the CPU 113, as shown in FIG. 8, displays a message prompting the user to perform an insertion execution or an adjustment operation to be described below, in the area A2 of the displaying part 122. The user can confirm the inserting position of the inserting-image by watching the displaying part 122.

Step S42: The CPU 113 judges whether the insertion execution has been instructed or not. Then, if determining that the insertion execution has been instructed, the CPU 113 goes to Step S45 to be described below. On the other hand, if determining that the insertion execution has not been instructed, the CPU 113 goes to Step S43. Note that the user instructs the insertion execution by operating the operating part 110. Further, when the plurality of inserting-images is inserted, the instruction may be configured to perform the insertion execution for each of the inserting-images.

Step S43: The CPU 113 judges whether the adjustment operation has been performed or not. Then, if determining that the adjustment operation has been performed, the CPU 113 goes to Step S44. On the other hand, if determining that the adjustment operation has not been performed, the CPU 113 returns to Step S42. Note that the adjustment operation is an operation for the user to adjust the inserting position. The user performs the adjustment operation by operating the operating part 110 while watching the preview image displayed on the displaying part 122. Note that, when the plurality of inserting-images is inserted, the adjustment may be configured to be operated for each of the inserting-images.

Step S44: The CPU 113 returns to Step S40 after having changed the inserting position according to the adjustment operation performed in Step S43.

Step S45: The CPU 113 inserts the inserting-image into the image data recorded temporarily in the memory 107 as in the above described first embodiment. When the plurality of inserting-images is inserted, the CPU 113 may insert the plurality of inserting-images at the same time. The CPU 113 records the image data having the inserted inserting-image temporarily into the memory 107.

Step S46: The CPU 113 records the image data recorded temporarily in the memory 107 into the recording part 108.

As described hereinabove, the second embodiment can obtain the same effect as the first embodiment using an image processing program for causing a computer to realize the image processing of the image data to be processed.

Further, the second embodiment displays a confirmation image for a user to confirm the determined inserting position on the displaying part of the computer. Accordingly, the user can confirm the insertion position of the inserting-image by watching the displaying part before executing the insertion of the inserting-image.

Further, the second embodiment displays the confirmation image for the user to confirm the determined inserting position on the displaying part of the computer, and receives an instruction for the insertion execution from the user after start of the displaying. Then, after receiving the instruction for the insertion execution, the second embodiment inserts the inserting-image at the inserting position of the image data to be processed. Accordingly, the user can confirm the inserting position of the inserting-image by watching the displaying part before the insertion execution of the inserting-image, and also can perform the instruction for the insertion execution at a desired timing after the confirmation.

Figure 7:
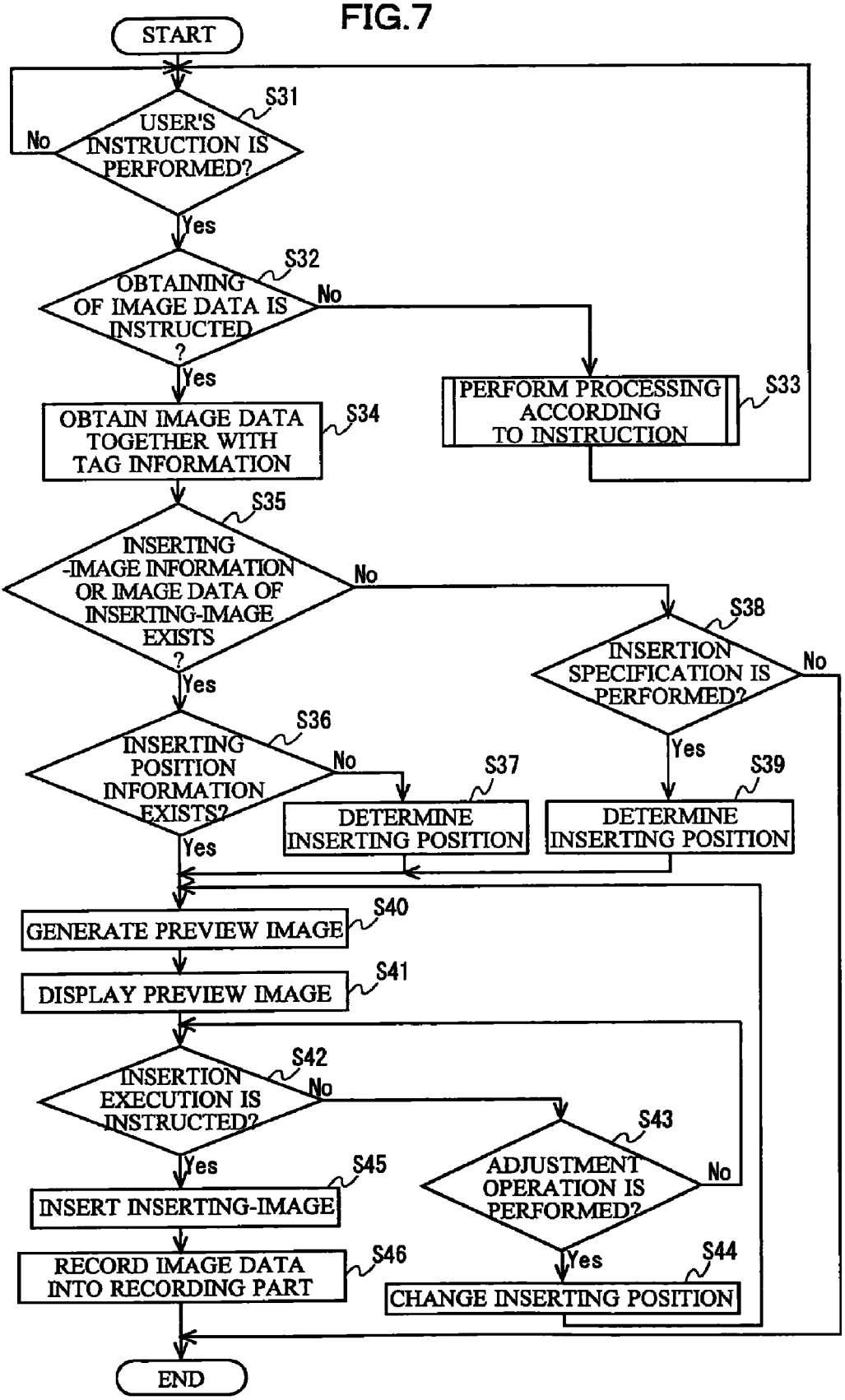
FIG. 7 is a flowchart showing an operation of the computer 100 according to the second embodiment.

Note that the second embodiment shows the exemplary configuration to process the plurality of inserting-images at the same time in Step S37 to Step S43 of FIG. 7 when inserting the plurality of inserting-images but there may be another configuration to process the plurality of inserting-images sequentially as in the first embodiment. Further, the first embodiment may have another configuration to process the plurality of inserting-images at the same time as the second embodiment.

Further, the first embodiment may have another configuration to display the image of the image data overlapping with the preview image and to receive the instruction for the insertion execution as the second embodiment. Still further, the digital still camera may have a configuration to record the control program recorded in the computer 100 of the second embodiment and to perform the same processing as in the second embodiment.

The many features and advantages of the embodiments are apparent from the detailed specification and, thus, it is intended by the appended claims to cover all such features and advantages of the emobiments that fall within the true spirit and scope thereof. Further, since numerous modification and changes will readily occur to those skilled in the art, it is not desired to limit the inventive embodiments to exact construction and operation illustrated and described, and accordingly all suitable modification and equivalents may be resorted to, falling within the scope thereof.

The invention claimed is:

1. A camera, comprising:
    an imaging unit imaging an image of an object and generating image data;
    a recognizing unit generating distribution information which represents a distribution of a main object in an image of said image data based on a result of a face recognition processing performed on said image data; and
    a decision unit determining an inserting position to insert an inserting-image into said image data based on at least one of said distribution information and contrast information of said object, wherein said decision unit determines said inserting position based on said distribution information and said contrast information, and said decision unit determines weight for said distribution information and weight for said contrast information based on a ratio of the weight for said distribution information to the weight for said contrast information, and determines said inserting position based on said distribution information and said contrast information weighted with said respective weights.

2. The camera according to claim 1, further comprising
an inserting unit inserting said inserting-image at said inserting position of said image data determined by said decision unit.

3. The camera according to claim 1, further comprising
a recording unit associating and recording said image data generated by said imaging unit, image data of said inserting-image, and said inserting position determined by said decision unit into a recording medium.

4. The camera according to claim 1, wherein
said inserting-image is an image representing a shooting condition of said imaging unit.

5. The camera according to claim 1, wherein
said decision unit determines weight for said distribution information and weight for said contrast information such that a ratio of the weight for said distribution information to the weight for said contrast information to be larger as an area ratio of said main object to the whole of said object becomes larger.

6. The camera according to claim 1, further comprising:
a setting unit setting any shooting mode among a plurality of shooting modes, wherein
said imaging unit images said image of said object and generates said image data in a shooting condition according to said shooting mode set by said setting unit, and
said decision unit determines weights of said distribution information and said contrast information based on a kind of said shooting mode set by said setting unit, and determines said inserting position based on said distribution information and said contrast information weighted with said respective weights.

7. The camera according to claim 1, wherein
said decision unit limits an inserting area of said inserting-image in said image of said image data based on attribute information of said inserting-image and determines said inserting position to insert said inserting-image within said inserting area.

8. A non-transitory computer-readable medium having computer-executable instructions comprising:
an obtaining operation of obtaining an image data to be processed;
a recognition operation of generating distribution information representing a distribution of a main object in an image of said image data based on a result of a face recognition processing performed on said image data; and
a decision operation of determining an inserting position to insert an inserting-image into said image data based on at least one of said distribution information and contrast information of said object, wherein said decision operation includes
determining said inserting position based on said distribution information and said contrast information,
determining weight for said distribution information and weight for said contrast information based on a ratio of the weight for said distribution information to the weight for said contrast information, and
determining said inserting position based on said distribution information and said contrast information weighted with said respective weights.

9. The non-transitory computer-readable medium according to claim 8, further comprising
an inserting operation of inserting said inserting-image in said inserting position of said image data determined in said decision operation.

10. The non-transitory computer-readable medium according to claim 9, further comprising:
a displaying operation of displaying the confirmation image for a user to confirm said inserting position determined in said decision operation on the displaying part of said computer; and
a receiving operation of receiving an instruction for insertion-execution from said user after said displaying operation has started to display said confirmation image, wherein
said inserting operation inserts said inserting-image in said inserting position of said image data when said receiving operation receives said instruction.

11. The non-transitory computer-readable medium according to claim 8, wherein
said obtaining operation obtains inserting information determined based on information of said object in said image data together with said image data.

12. The non-transitory computer-readable medium according to claim 8, wherein
said obtaining operation obtains information representing a generation condition during generating said image data together with said image data, and
said inserting-image is an image representing said generation condition.

13. The non-transitory computer-readable medium according to claim 8, wherein
said decision operation determines weight for said distribution information and weight for said contrast information such that a ratio of the weight for said distribution information to that the weight for said contrast information to be larger as an area ratio of said main object to a whole image plane of said image data becomes larger.

14. The non-transitory computer-readable medium according to claim 8, wherein
said obtaining operation obtains said image data generated by imaging an image of an object in a shooting condition according to any shooting mode among a plurality of selectable shooting modes, and obtains a kind of the shooting mode set at the time of generating said image data, and
said decision operation determines weights of said distribution information and said contrast information based on the kind of said shooting mode, and determines said inserting position based on said distribution information and said contrast information weighted with said respective weights.

15. The non-transitory computer-readable medium according to claim 8, wherein
said decision operation limits an inserting area of said inserting-image in said image of said image data based on attribute information of said inserting-image and determines the inserting position to insert said inserting-image within said inserting area.

16. The non-transitory computer-readable medium according to claim 8, further comprising
a displaying operation of displaying a confirmation image for a user to confirm said inserting position determined in said decision operation on a displaying part of said computer.

17. A camera, comprising:
an imaging unit imaging an image of an object and generating image data;
a recognizing unit generating distribution information which represents a distribution of a main object in an image of said image data based on a result of a face recognition processing performed on said image data; and a decision unit determining an inserting position to insert an inserting-image into said image data based on at least one of said distribution information and contrast information of said object, wherein
said decision unit determines said inserting position based on said distribution information and said contrast information; and a setting unit setting any shooting mode among a plurality of shooting modes, wherein
said imaging unit images said image of said object and generates said image data in a shooting condition according to said shooting mode set by said setting unit, and
said decision unit determines weights of said distribution information and said contrast information based on a kind of said shooting mode set by said setting unit, and determines said inserting position based on said distribution information and said contrast information weighted with said respective weights.

18. The camera according to claim 17, further comprising an inserting unit inserting said inserting-image at said inserting position of said image data determined by said decision unit.

19. The camera according to claim 17, further comprising a recording unit associating and recording said image data generated by said imaging unit, image data of said inserting-image, and said inserting position determined by said decision unit into a recording medium.

20. The camera according to claim 17, wherein said inserting-image is an image representing a shooting condition of said imaging unit.

21. The camera according to claim 17, wherein said decision unit determines weight for said distribution information and weight for said contrast information such that a ratio of the weight for said distribution information to the weight for said contrast information to be larger as an area ratio of said main object to the whole of said object becomes larger, and determines said inserting position based on said distribution information and said contrast information weighted with said respective weights.

22. The camera according to claim 17, wherein said decision unit limits an inserting area of said inserting-image in said image of said image data based on attribute information of said inserting-image and determines said inserting position to insert said inserting-image within said inserting area.

\* \* \* \* \*